Aug. 4, 1959  C. L. GRAYBILL  2,897,688
HYDRAULIC TRANSMISSION MECHANISM
Filed Sept. 12, 1955  3 Sheets-Sheet 1

INVENTOR.
CLINTON L. GRAYBILL
BY

Aug. 4, 1959

C. L. GRAYBILL 2,897,688

HYDRAULIC TRANSMISSION MECHANISM

Filed Sept. 12, 1955

CLINTON L. GRAYBILL
INVENTOR.

BY

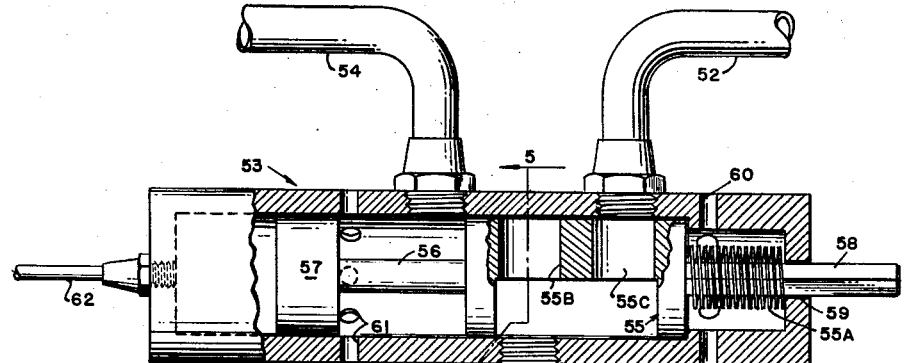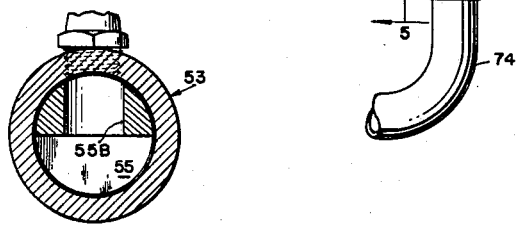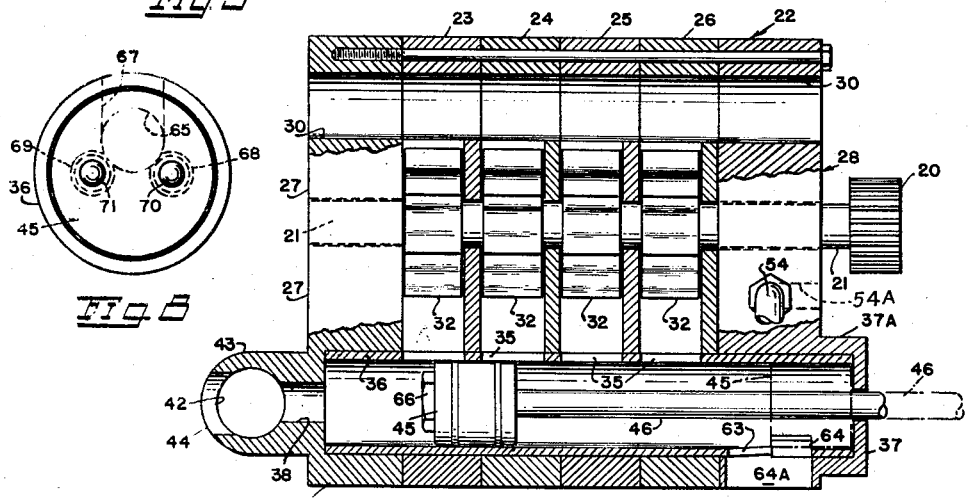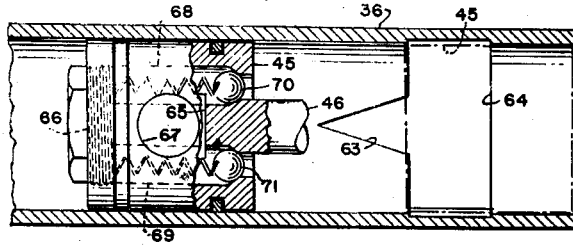

United States Patent Office 2,897,688
Patented Aug. 4, 1959

2,897,688

HYDRAULIC TRANSMISSION MECHANISM

Clinton Lee Graybill, Superior, Mont., assignor to Graybill Industries, Inc., Spokane, Wash., a corporation of Montana Application September 12, 1955, Serial No. 533,800

3 Claims. (Cl. 74—687)

This invention relates to a fluid-controlled transmission especially designed for the transmission of power from the engine of automotive vehicles such as passenger cars, trucks, busses and the like. The invention is also readily adaptable to transmit mechanical energy from any prime mover to a driven device.

One of the principal objects of the invention is the provision of a transmission of this character capable of diminishing ratio and increasing ratio through the use of a fluid coupling and fixed gearing in constant mesh and without the employment of friction bands, clutches or the like, the ratio infinitely diminishing or increasing in relation to the applied load.

A further object is to provide a transmission which in operation provides an automatically effected neutral under control of the motor for idling speed, thereby insuring against stalling of the engine; to provide a starting and low gear arrangement operable with an infinitely variable speed ratio while the driving torque remains constant to thereby allow starting with the engine operating at a relatively high speed ratio to the driven shaft which ratio is automatically progessively diminished to a full low speed drive ratio and the provision of means operative automatically to effect a high gear or direct drive condition when the vehicle has attained a given speed.

The foregoing and other objects will appear as my invention is more fully hereinafter described in the following specification, illustrated in the accompanying drawings, and finally pointed out in the appended claims.

In the accompanying drawings:

Figure 1 is a top plan view of a transmission made in accordance with my invention with fragments broken away and parts in section and with the top half of the transmission housing removed.

Figures 2 and 3 are sectional end views taken respectively along the lines 2—2 and 3—3 of Figure 1.

Figure 4 is a longitudinal sectional view of a fluid-flow control valve.

Figure 5 is a sectional end view taken along the line 5—5 of Figure 4.

Figure 6 is a longitudinal sectional side view of a fluid motor.

Figure 7 is a fragmentary sectional plan view of a fluid distributing cylinder and controlling piston therefor.

Figure 8 is an end view of Figure 7.

Figure 2:
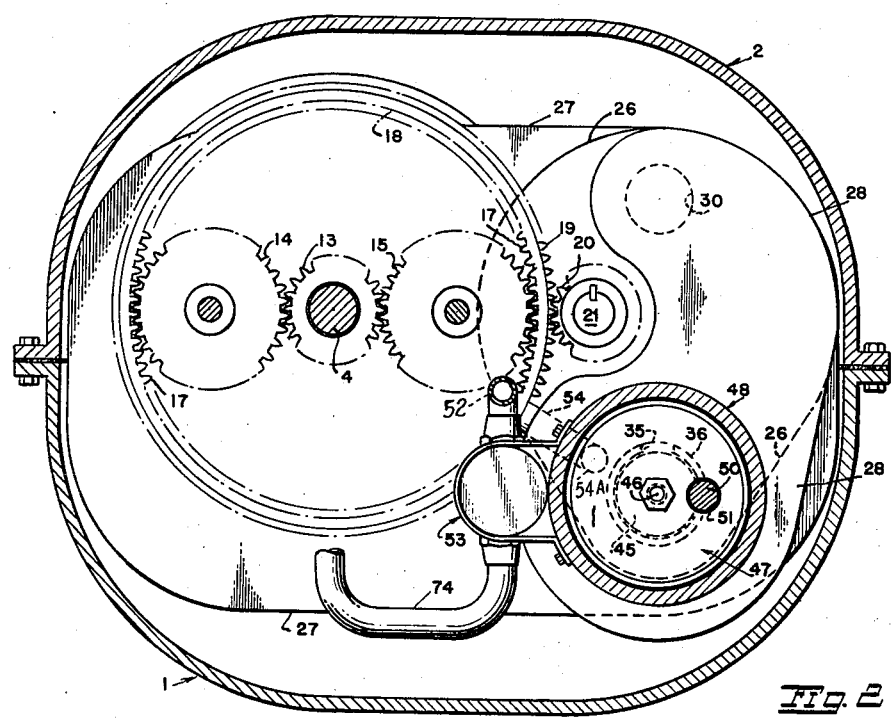

Referring now more particularly to the drawings:

The invention is encased within a fluid-tight housing generally indicated by reference numeral 1, suitably flanged and provided with a gasket for bolted and sealed attachment to an identical top section, a portion of which is indicated by reference numeral 2 in Figure 2. The housing is substantially filled with suitable fluid which may be oil.

Figure 3:
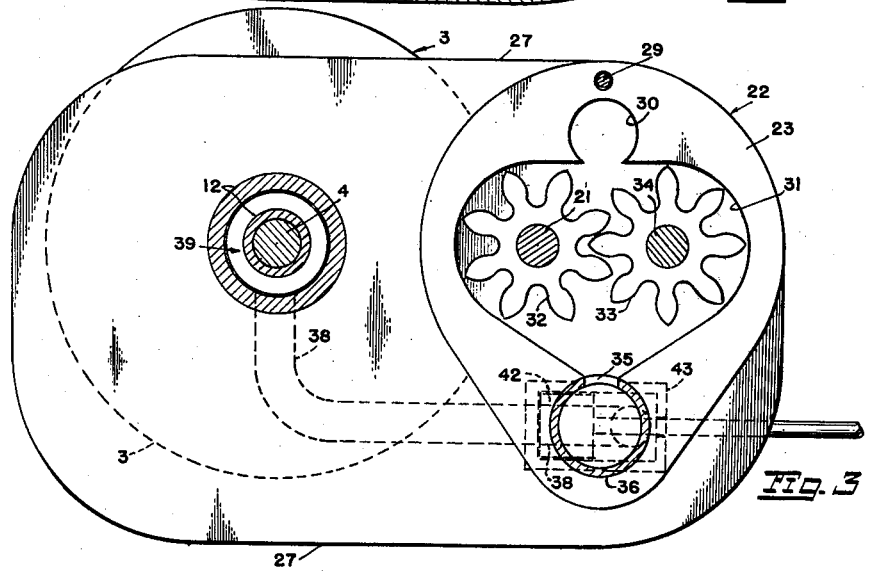

A gear pump housing generally indicated at 3 is rotatably mounted within the housing 1 upon a driven shaft 4 journaled as at 5 in a tubular extension 6 of the removable wall 7 of the pump housing and in the end wall of the housing 1 as at 8. The extension 6 is adapted for attachment to an engine shaft (not shown). Driven shaft is journaled in a suitable radial thrust bearing 9 carried by the opposite end of the housing 1. Pump gears A and B are rotatably mounted by means of their respective shafts carried by the front wall 7 and the back wall 10 of the pump housing and mesh with a sun gear C secured to the driven shaft 4 for rotation therewith. Said opposite wall 10 of the pump housing 3 is bolted to a backing plate 11 which is cast integral with a hollow tubular shaft 12 surrounding the driven shaft 4 and terminating in a sun gear 13 meshing at all times with planet gears 14 and 15 rotatably attached to a planet carrier 16 cast integral with the driven shaft 4. The planet gears (see also Figure 2) are in mesh at all times with the internal gear teeth 17 of a ring gear 18 also having external gear teeth 19. The external gear teeth are in mesh with a gear 20 secured to one shaft 21 of an hydraulic motor generally indicated at 22 in Figures 1 and 3. The hydraulic motor proper comprises four or any desired number of identical units indicated at 23, 24, 25 and 26 all secured together and to end plates 27 and 28 by bolts 29. An aligned bore 30 extends entirely through the end plates and through the individual motor units to provide a fluid by-pass which is in open communication at both of its ends with the interior of the fluid reservoir or housing 1. The by-pass is also in open communication (Figures 3 and 6) with a chamber 31 in each motor unit within which its respective motor gears 32 and 33 are rotatably mounted and operatively intermeshed. The gears 32 are secured to the shaft 21 which carries the gear 20 as aforesaid while the gears 33 are rotatable about a fixed shaft 34 secured at both of its ends in any approved manner to the end plates 27 and 28. The bottom of each motor chamber converges into open communication as at 35 with the interior of a horizontally disposed fluid-distributing cylinder 36 closed at one of its ends by an end wall 37 of a cylindrical projection 37A from the end wall 28. The opposite end of the cylinder 36 is open to a duct 38 communicating with an annular groove 39 formed in the hollow tubular shaft 12. Fluid entering the pump housing 3 through intake ports 40 is directed under pressure through exhaust ports 41 to the groove 39 and duct 38 and then selectively into the fluid-distributing cylinder 36 or the reservoir. The fluid can be diverted from the open end of the distributing cylinder and back into the reservoir by a piston valve 42 operable in a cylinder 43 open as at 44 to the reservoir. Movement of the piston into the broken line position shown will confine the flow of the fluid from the duct 38 into the distributing cylinder 36.

Slidably mounted within the distributing cylinder is a piston 45 connected by a rod 46 to a piston 47 slidably mounted within a control cylinder 48 secured at one of its ends to the end plate 28 of the fluid motor and closed at its opposite end by a plate 49. A tapered rod 50 is secured at one of its ends to the end wall 49 of the control cylinder, extends through an opening 51 in the piston 47 and is secured at its opposite end to the end wall 37 of the projection 37A from the motor end plate 28. The interior of one end of the control cylinder 48 communicates, by means of a tube 52, with the interior of a control valve housing 53 also in communication with the opposite end of the control cylinder 48 by means of a tube 54 and a port 54A extending through the motor plate 28 to which that end of the control cylinder is secured. A piston valve 55 backed by a compression spring 55A and vertically ported as at 55B and 55C is slidably mounted within the valve housing and connected by a rod 56 to an actuating piston 57. The opposite end of the piston valve is provided with a stem 58 of square formation in cross-section extending through a square opening 59 in the end wall of the valve housing to prevent rotation of the piston valve. The valve housing is ported near this end as at 60 and also ported as at 61 between the piston valve 55 and actuating piston 57. The interior of the opposite end of the valve housing is connected by a tube 62 to the duct 38.

As best illustrated in Figures 6 and 7, the fluid-distributing cylinder 36 is provided with a V-shaped opening 63 opening into a rectangular opening 64. Both openings register with and are in communication with the reservoir by means of an opening 64A in the bottom of the end plate 28. The piston 45 as shown in Figures 7 and 8 is horizontally bored inwardly from one of its ends as at 65 and the bore is closed by a plug 66. The bore is open to a vertical port 67 and also to parallel bores 68 and 69 open to the interior of the fluid-distributing cylinder 36 and controlled by spring urged ball-check valves 70 and 71.

Figure 1:
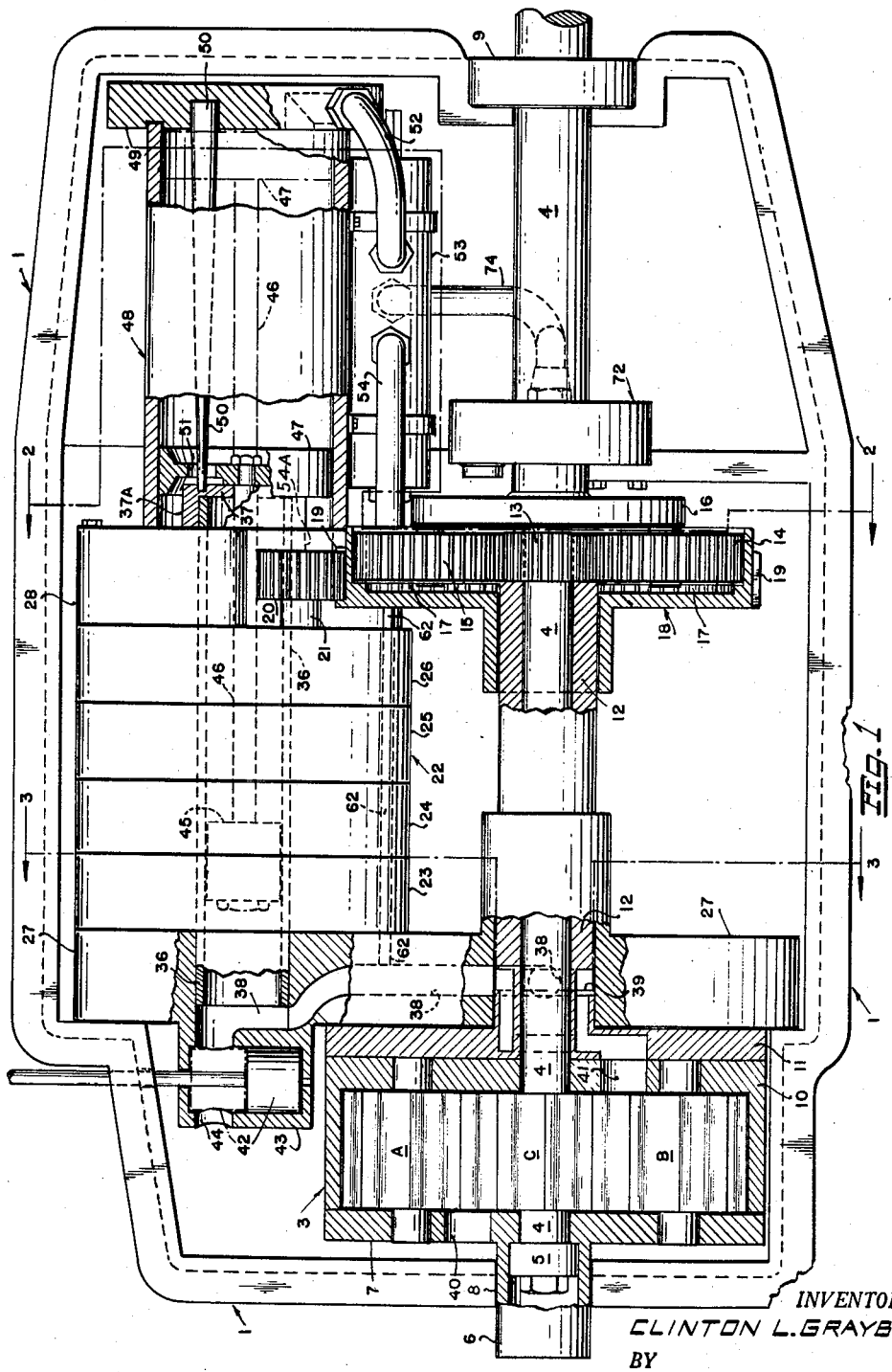

Any suitable type of positive displacement pump 72 is mounted as at 73 to the interior of the housing 1 and is geared to or otherwise driven by the driven shaft 4 when in operation to deliver fluid under pressure through a tube 74 to the interior of the control valve housing under certain conditions to be described with the operation of the invention, which is as follows:

Assuming that the vehicle is at a standstill with its engine running at idling speed and that the piston 42 is in the full line position shown in Figure 1, then fluid from the gear pump 3 will flow freely through the duct 38 and out through the opening 44 and back into the reservoir. At the same time the sun gear 13 is driving the planet gears 14 and 15 in fixed orbits of rotation because their carrier 16 is held against rotation by the load or driven shaft 4. The planet gears thus drive the ring gear 18, for example, in a clockwise direction, as viewed from the right-hand end of Figure 1, and the external teeth 19 of the ring gear rotate the gear 20 counter-clockwise. The motor gears 32 being secured to the shaft 21 will, of course, rotate in the same direction and the pumping action of both sets of gears 32 and 33 will circulate fluid from the reservoir through the by-pass 30 down into the fluid distributing cylinder 36 and back into the reservoir through open port 44 in the cylinder 43. The capacity of the port 44 is such that the fluid will freely circulate as aforesaid so that the transmission will remain in "neutral" with the engine running at any speed. At this particular time the piston 45 as shown in broken lines in Figure 6 is positioned over and closes the rectangular opening 64 in the fluid-distributing cylinder, with the piston 47 being in its broken line position (Fig. 1) shown within the control cylinder 48.

With the engine running at a low idling speed preparatory to putting the vehicle in forward motion I operate suitable control means, which through suitable linkage will pull the piston 42 into the broken line position to seal off the port 44 and thereby direct the fluid from the pump 3 and duct 38 directly into the fluid-distributing cylinder 36. Fluid pressure through tube 62 into control valve housing 53 maintains the piston valve 55 therein to the right as viewed in Figure 4. Fluid at the same time is forced into the cylinder 36 under pressure from the motor gears 32 and 33 being driven by the gear 20, external ring gear 19, planet gears 14—15 which are driven by the sun gear 13, which as aforesaid is integral with the hollow shaft 12 driven by the rotating pump housing 3. This combined volume of fluid under such pressure within the cylinder 36 is restricted in its passage out through the V-shaped opening 63 and the resultant back pressure of the fluid will allow the motor gears to rotate at a predetermined relatively low speed to thus temporarily limit the speed of rotation of the ring gear 18. As the engine speed and hence the speed of the sun gear and planet gears is increased, the planet gears will impart rotation through their carrier 16 to the driven shaft 4 as they rotate about the inner ring gear 17 because of its limited speed of rotation. When the driven shaft 4 is thus put in rotation, the positive displacement pump, driven by the now rotating shaft 4, will direct fluid pressure into the valve housing 53 from where it will be directed through the port 55C of the piston 55, through tube 52 into the control cylinder 48 back of the piston 47 when in the broken line position shown. The piston 47 and the piston 45 will then start moving to the left as shown in Figure 1. Then as the piston 45 gradually closes off the V-shaped opening 63 the speed of rotation of the motor gears will be gradually reduced by the gradual confinement of the fluid within the motor gear chambers 31. The gradual slowing down of the gear 20 and the motor gears 32—33 will, of course, cause a gradual and progressively increasing speed of rotation of the planet carrier 16 and driven shaft 4. When the V-shaped opening 63 is completely closed off by the piston 45 the static fluid trapped within the motor gear chambers 31 will lock the motor gear 32 against rotation in a counter-clockwise direction and, of course, the ring gear 18 against rotation in a clockwise direction. When the ring gear is thus at a standstill, the planet gears 14 and 15 will drive the planet carrier and shaft 4 in a counter-clockwise direction to drive the vehicle forward. It is to be noted that the speed of rotation of the hollow shaft 12 and pump housing 3 (turning at engine speed) is greater than the speed of rotation of the driven shaft 4 which is secured to the center pump gear C to thus continue the supply of fluid under pressure from the pump to the fluid-distributing cylinder 36 and up into the motor chambers to impart rotation to the motor gears and gear 20 in an opposite or clockwise direction. The gear 20 then, of course, drives the ring gear 18 in a counter-clockwise direction and thereby increases the speed of rotation of the planet carrier and shaft 4. The increased speed of shaft 4 will cause the positive displacement pump 72 to deliver an increased volume of fluid back of the piston 47 as the piston moves farther to the left (Figure 1) determined by the amount of fluid release limited by the position of the opening 51 in the piston 47 in relation to the variable diameter of the rod 50.

The volumetric output of the pump 3 is variable in accordance with the speed of rotation of the driven shaft 4 to which sun gear C of the pump is secured, and also in accordance with the speed of the shaft of the vehicle engine to which the pump housing 3 is secured. Therefore, when the pump housing is rotating at a greater speed than the shaft 4, its output into cylinder 36 will drive all the motors at a certain speed, provided, of course, that the piston 45 is in a position so as not to obstruct the flow of fluid from the cylinder 36 into the motors. When, however, as the motors are progressively cut off by the piston 45 in its travel through the cylinder 36, the remaining operable motors will be driven at a higher speed to drive the gear 18 at a higher speed, which, of course, increases the speed of the shaft 4 which will cause the pump 72 to deliver an increased volume of fluid into the cylinder 48 to force the pistons 47—45 to the left whereby the piston 45 will cut out the remaining operable motors except the last one 23 because of the location of the stopping point shown in dotted lines (Figure 1 and full lines Figure 6) of the piston 45 wherein it allows sufficient fluid to enter the motor unit 23 to maintain it in operation. At this time the shaft 4 is rotating at its highest speed relative to the shaft 12 or shaft of the vehicle engine wherein their speed ratio is approaching unity. As the piston 45 crosses the opening 35 into each motor the check valves 70 and 71 will open to allow fluid from back of the piston to enter each motor it passes to prevent suction within each motor.

Assuming now that an increased load, by hill climbing or the like, is applied to the driven shaft 4, its reduced speed of rotation will, of course, reduce the output of the pump 72 and reduce the pressure against piston 47 to allow it and piston 45 to move to the right (Figure 1). The pump 3 being driven at the same speed as the engine and at a greater speed than shaft 4 will deliver an increased volume of fluid into cylinder 36 then up into the motors to drive the same at a slower speed, which, of course, will increase the torque of shaft 4 to handle the overload. Conversely, upon deceleration of the engine when the vehicle is running on a downgrade, for example, and the shaft 4 is then driving the sun gear C at a greater speed of rotation than that of the pump housing due to reduced engine speed, the fluid pressure within the pump housing will be reversed thus creating a suction within the cylinder 36 and in the control valve housing through tube 62, whereby control piston 55 will be moved to the left (Figure 4) to put tube 74 into communication with tube 54 to apply pressure to the interior of cylinder 48 to the left of piston 47 to force it and piston 45 to the right. The suction now applied to the motor gears by the pump 3 retards their speed and consequently retards the speed of gear 20, ring gear 18, planet carrier and shaft 4, which, of course, retards the speed of the vehicle.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

1. A power transmission device comprising a power input shaft and a power output shaft, a fluid pressure generator and an epicyclic gearing both driven by the power input shaft, the output shaft being driven by the epicyclic gearing, a plurality of hydraulic motors geared to the epicyclic gearing, a fluid pressure distributing cylinder having an opening at one of its ends, a first valve adapted to close and open said opening to thereby selectively deliver fluid pressure from said fluid pressure generator to said motors or to bypass it away from the motors, said cylinder having a restricted discharge opening at its opposite end, a second fluid pressure generator driven by the power output shaft, piston means slidably mounted within said distributing cylinder, a valve communicating with and adapted to control the flow of pressure from said second generator to the interior of said distributing cylinder to move said piston means in one direction when said opening at said one end of the cylinder is closed by said first valve is thereby progressively close off said restricted opening and thereby direct the output of said first mentioned fluid pressure generator to said hydraulic motors to retard and finally stop their rotation in one direction whereby upon increased speed of rotation of said power input shaft the resultant increase of fluid pressure from the first mentioned fluid pressure generator will reverse the direction of rotation of said hydraulic motors to thereby increase the speed of rotation of said power output shaft through said epicyclic gearing.

2. A power transmission device comprising a power input shaft and a power output shaft, a fluid pressure generator and an epicyclic gearing both driven by the power input shaft, the output shaft being driven by the epicyclic gearing, a plurality of hydraulic motors geared to the epicyclic gearing, a fluid pressure distributing cylinder having an opening at one of its ends, a first valve adapted to close and open said opening to thereby selectively deliver fluid pressure from said fluid pressure generator to said motors or to bypass it away from the motors, said cylinder having a restricted discharge opening at its opposite end for escapement of fluid pressure from said fluid pressure generator when the input shaft is running at idling speed and the hydraulic motors are being rotated in one direction by said epicyclic gearing, a second fluid pressure generator driven by the power output shaft, piston means slidably mounted within said distributing cylinder, a valve communicating with and adapted to control the flow of pressure from said second generator to the interior of said distributing cylinder to move said piston means in one direction when said opening at said one end of the cylinder is closed by said first valve to thereby progressively close off said restricted opening and thereby direct the output of said first mentioned fluid pressure generator to said hydraulic motors to retard and finally stop their rotation in one direction whereby upon increased speed of rotation of said power input shaft the resultant increase of fluid pressure from the first mentioned fluid pressure generator will reverse the direction of rotation of said hydraulic motors to thereby increase the speed of rotation of said power output shaft through said epicyclic gearing.

3. A power transmission device comprising a power input shaft and a power output shaft, a fluid pressure generator and an epicyclic gearing both driven by the power input shaft, the output shaft being driven by the epicyclic gearing and fluid-coupled to the fluid pressure generator, a plurality of hydraulic motors geared to the epicyclic gearing, a fluid pressure distributing cylinder having an opening at one of its ends, a first valve adapted to close and open said opening to thereby selectively deliver fluid pressure from said fluid pressure generator to said motors or to bypass it away from the motors, said cylinder having a restricted discharge opening at its opposite end for escapement of fluid pressure from said fluid pressure generator when the input shaft is running at idling speed and the hydraulic motors are being rotated in one direction by said epicyclic gearing, a second fluid pressure generator driven by the power output shaft, piston means slidably mounted within said distributing cylinder, a valve communicating with and adapted to control the flow of pressure from said second generator to the interior of said distributing cylinder to move said piston means in one direction when said opening at said one end of the cylinder is closed by said first valve to thereby progressively close off said restricted opening and thereby direct the output of said first mentioned fluid pressure generator to said hydraulic motors to retard and finally stop their rotation in one direction whereby upon increased speed of rotation of said power input shaft the resultant increase of fluid pressure from the first mentioned fluid pressure generator will reverse the direction of rotation of said hydraulic motors to thereby increase the speed of rotation of said power output shaft through said epicyclic gearing.

References Cited in the file of this patent

UNITED STATES PATENTS

| | | |
|---|---|---|
| 934,716 | Dodd | Sept. 21, 1909 |
| 1,998,922 | Chamberlin et al. | Apr. 23, 1935 |
| 2,223,716 | Bojesen | Dec. 3, 1940 |